US012542428B2

(12) United States Patent
Ore et al.

(10) Patent No.: US 12,542,428 B2
(45) Date of Patent: Feb. 3, 2026

(54) METHOD AND SYSTEM FOR A DC NANOGRID

(71) Applicants: Purdue Research Foundation, West Lafayette, IN (US); Rectify LLC, Indianapolis, IN (US)

(72) Inventors: Jonathan Ore, Jacksonville, FL (US); Philip Teague, Indianapolis, IN (US); Frank W. Teague, III, Campbell, CA (US); Eckhard Groll, West Lafayette, IN (US)

(73) Assignees: Purdue Research Foundation, West Lafayette, IN (US); Rectify LLC, Indianapolis, IN (US)

( * ) Notice: Subject to any disclaimer, the term of this patent is extended or adjusted under 35 U.S.C. 154(b) by 304 days.

(21) Appl. No.: 18/227,784

(22) Filed: Jul. 28, 2023

(65) Prior Publication Data

US 2024/0039252 A1 Feb. 1, 2024

Related U.S. Application Data

(60) Provisional application No. 63/393,117, filed on Jul. 28, 2022.

(51) Int. Cl.
*H02H 3/00* (2006.01)
*H02B 1/18* (2006.01)
*H02B 1/20* (2006.01)
*H02H 3/16* (2006.01)

(52) U.S. Cl.
CPC ............... *H02B 1/20* (2013.01); *H02B 1/18* (2013.01); *H02H 3/16* (2013.01)

(58) Field of Classification Search
IPC ......................................................... H02B 1/20
See application file for complete search history.

(56) References Cited

U.S. PATENT DOCUMENTS

| 10,199,832 | B2 * | 2/2019 | Gupta | H02M 7/44 |
| 10,199,940 | B1 * | 2/2019 | Bui | H02J 1/082 |
| 2006/0237058 | A1 * | 10/2006 | McClintock | H02J 13/00002 |
| | | | | 136/244 |
| 2015/0054490 | A1 * | 2/2015 | Debone | H02S 50/10 |
| | | | | 324/76.39 |
| 2021/0376739 | A1 * | 12/2021 | Liu | H02M 7/23 |

OTHER PUBLICATIONS

Pellis, The DC Low-Voltage House, Report of a Graduation Project for the Eindhoven University of Technology, Completed at the Netherlands Energy Research Foundation ECN, 1997.

(Continued)

*Primary Examiner* — Stephen W Jackson
(74) *Attorney, Agent, or Firm* — Piroozi-IP, LLC

(57) ABSTRACT

A direct current (DC) electrical panel (DC Combiner) is disclosed which includes a plurality of input pairs of positive and negative inputs, each input pair of the plurality of input pairs is configured to provide a positive DC input at a predefined voltage and a negative DC return, each positive input is coupled to a protection circuit whereby each such positive input is isolated from other positive inputs of the plurality of input pairs, thereby generating a protected input, each protected input is coupled to a busbar, and the busbar coupled to a plurality of switched circuits via a breaker switch in line with a protected input.

26 Claims, 2 Drawing Sheets

(56) References Cited

OTHER PUBLICATIONS

Savage et al., DC Microgrids: Benefits and Barriers, Yale school of forestry & environmental studies, Data Unknown.
Ehrlich, The Death and Rebirth of DC Power, BuildingGreen, 2016.
Patterson, The Role of Hybrid AC/DC Building Microgrids in Creating a 21st Century Enernet, Continental Automated Building Association White Paper, 2016.
Burger, Shouldn't We Have More DC Microgrids?, Mircrogid projects, 2018.
Ore et al., Design and Development of a Decentralized and Distributed Iot Home Monitoring System Within a DC Nanogrid, 2020 Building Performance Analysis Conference and SimBuild co-organized by Ashrae and IBPSA-USA, 2020.
Ore et al., Evaluation of a Hybrid AC/DC Powered Residential Split-System Heat Pump Performance using a DC Nanogrid, 13th IEA Heat Pump Conference, 2020.
Ore et al., Analysis of a Residential House for the Design and Implementation of a DC Nanogrid, IEEE PES Innovative Smart Grid Technologies Europe, 2020.
Ore et al., Optimization of Building Energy Management through the Implementation of an Economical Hyperlocal Weather Station in an Integrated DC Picogrid, Ashrae Transactions 128, Jan. 20, 2021.
Ore, CPS 7—Energy Consumption and Potential Savings in Residential Dwellings, Center for high performance buildings at Purdue, Feb. 9, 2021.
Ore, Motivation of Modern Topologies, DCPowered Solutions, and Applications Within Residential Environments, 6th International High Performance Buildings Conference at Purdue, May 24, 2021.

\* cited by examiner

METHOD AND SYSTEM FOR A DC NANOGRID

CROSS-REFERENCE TO RELATED APPLICATIONS

The present patent application is related to and claims the priority benefit of U.S. Provisional Patent Application Ser. No. 63/393,117 filed Jul. 28, 2022, the contents of which are hereby incorporated by reference in its entirety into the present disclosure.

STATEMENT REGARDING GOVERNMENT FUNDING

None.

TECHNICAL FIELD

The present disclosure generally relates to power distribution and in particular to power distribution integrating a variety of direct current (DC) sources.

BACKGROUND

This section introduces aspects that may help facilitate a better understanding of the disclosure. Accordingly, these statements are to be read in this light and are not to be understood as admissions about what is or is not prior art.

Alternating current (AC) power grids of part of everyday life. While electronic controls have been added to the AC grids for improved functionality, AC grids have been fraught with capacity, reliability, and a host of other issues. The systematic and spatial layout of power grids makes them especially vulnerable to cascading failures. The Federal Energy Regulatory Commission (FERC) in the U.S. warned that a loss of merely nine key substations out of 55,000 could result in a country-wide blackout. Modern technological innovations in line with renewable energy, vehicle to grid, battery, and a host of other technologies have exploded in the past several decades. Unfortunately, AC grids have not kept up a parallel rate of technological advancement, with some estimates reporting on the order of trillions of dollars necessary for repairs and upgrades on a country-wide basis to establish a nominal performance level. In addition, the variation in AC frequency used in transmission lines between the North America and Europe has been a long-standing issue challenging appliance manufacturers, industrial factories, and standards working groups. A transition to a common in-house DC voltage reference seeks to alleviate many of these issues, and establish electrical unification both intra- and intercontinentally.

Many of the renewable energy systems such as wind and solar power generation systems are naturally configured to produce DC power but suffer conversion losses to transform into AC for distribution and transmission. These losses are further exacerbated when DC-based devices, such as LEDs, cell phones, computers, TVs, etc. must convert again from AC to DC. A consistent DC voltage offers to mitigate these losses through the avoidance of unnecessary conversion losses and stability concerns inherent in AC-based systems. Many studies have been conducted indicating the potential energy savings from moving to a DC-driven system, especially those with significant lighting elements.

Other devices with considerable energy consumption needs, such as heating, ventilation, and air-conditioning (HVAC) equipment, employ DC-driven devices such as variable-speed drives (VSDs), fans, pumps, and other power electronics. These devices rely heavily on AC-DC conversions, increasing in power loss and decreasing their energy efficiency. According to recent research, it is estimated that approximately 30% of all generated AC power is processed through conversion electronics before it reaches the end point of use [3]. These conversions are associated with a nontrivial amount of power dissipation, and based on studies performed by the EMerge Alliance, the amount of energy lost may range up to 25% on average.

However, doing away with the current AC grid and all the existing infrastructure may prove to be too much for the immediate future.

Therefore, there is an unmet need for a novel approach to allow a nanogrid within a dwelling that can seamlessly interface with existing AC grid and provide substantially uninterrupted and reliable power to both DC and AC loads within the dwelling.

SUMMARY

A direct current (DC) electrical panel (DC Combiner) is disclosed which includes a plurality of input pairs of positive and negative inputs, each input pair of the plurality of input pairs is configured to provide a positive DC input at a predefined voltage and a negative DC return, each positive input is coupled to a protection circuit whereby each such positive input is isolated from other positive inputs of the plurality of input pairs, thereby generating a protected input, each protected input is coupled to a busbar, and the busbar coupled to a plurality of switched circuits via a breaker switch in line with a protected input.

A nanogrid system for use in a commercial or residential setting (dwelling) is also disclosed which includes an alternating current (AC) utility input from a utility provider, a plurality of direct current (DC) sources configured to generate DC voltage at one or more DC levels, wherein each DC source generating a voltage different than a predefined voltage is coupled to an external DC-DC converter configured to output a DC voltage at about the predefined voltage, thereby generating a converted DC source, a bidirectional inverter coupled to the AC utility input and a DC electrical panel (DC Combiner), the bidirectional inverter configured to invert the DC voltage at the DC Combiner to an AC voltage to be used by AC loads within the dwelling. The DC Combiner includes a plurality of input pairs of positive and negative inputs, each input pair of the plurality of input pairs is configured to provide a positive DC input at a predefined voltage and a negative DC return, each positive input is coupled to a protection circuit whereby each such positive input is isolated from other positive inputs of the plurality of input pairs, thereby generating a protected input, each protected input is coupled to a busbar, and the busbar coupled to a plurality of switched circuits via a breaker switch in line with a protected input.

DETAILED DESCRIPTION

Figure 1:
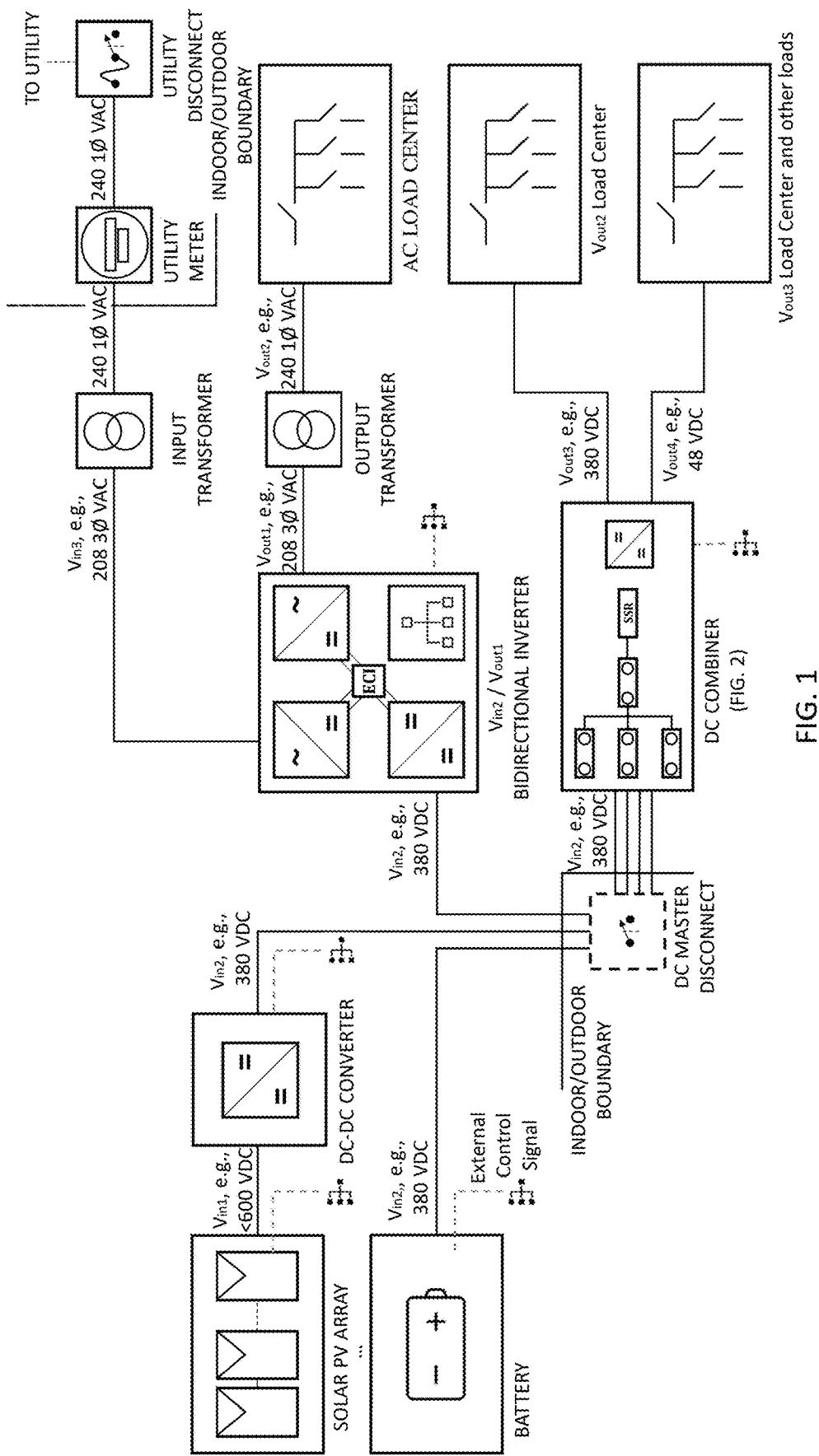
FIG. 1 is a schematic of a nanogrid system for use in a commercial or residential setting including a DC combiner, according to one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

The present disclosure presents a novel approach for a nanogrid within a dwelling that can seamlessly interface with existing AC grid and provide substantially uninterrupted and reliable power to both DC and AC loads within the dwelling. Towards this end, a novel system is disclosed herein which includes a novel DC nanogrid panel configured to interface with a host of DC sources and provide electrical power to DC loads as well as AC loads.

Referring to FIG. 1, an AC/DC nanogrid system is shown, according to the present disclosure. A variety of DC power generating sources including a solar photovoltaic (PV) array (an example of which is the 14.3 kW solar PV array made by PANASONIC 325 W VBHN325KA03), a battery, and other such sources (not shown) but including vehicle to grid, wind power, tidal power, DC generator, and other such sources known to a person having ordinary skill in the art are shown in FIG. 1. In FIG. 1, only the solar PV array and battery are shown. The solar PV array may provide an input voltage $V_{in1}$, e.g., about 600 VDC or less while the battery may provide $V_{in2}$, e.g., about 380 VDC. These sources are either directly coupled to a DC combiner (further discussed in relations to FIG. 2) or are first conditioned via a converter prior to being coupled to the DC combiner. For example, the solar PV array generates up to 600 VDC ($V_{in1}$). The DC combiner according to the present disclosure seeks to maintain its input voltage at about 380 VDC ($V_{in2}$). Therefore, a DC-DC converter, e.g., with maximum power point tracking (MPPT) is used with the solar array to down convert the voltage (up to 600 VDC, $V_{in1}$) down to 380 VDC, $V_{in2}$. An example of the DC-DC converter with MPPT is the CE+T 30C3 Stability 30 kW Multiport Power Conversion System from CE+T AMERICA. Thus, all DC sources are up converted, down converted, or passed on to the DC combiner directly at about 380 VDC, $V_{in2}$. For example, a battery system (e.g., POMCUBE PNZ-12.5K1N2-NA0 20 kWH 380 VDC LiFePO4) directly provides 380 VDC, $V_{in2}$, to the DC combiner and thus no conversion is needed.

Another input to the DC combiner is from a $V_{in2}/V_{out1}$, e.g., about 380 VDC/240 VAC bi-directional inverter (e.g., CE+T AMERICA 380 VDC MIPS-380-2-40-00-16) which provides as output 240 VAC ($V_{out2}$) and 380 VDC ($V_{in2}$), while receiving as input three-phase 208 VAC ($V_{in3}$). The inverter is bi-directional which means the 380 VDC output ($V_{in2}$) is also maintained at that voltage. Thus the inverter not only provides AC-DC and DC-AC conversion, but it also maintains the 380 VDC output ($V_{in2}$) by regulating that voltage. Thus, as will be discussed with respect to FIG. 2, if one of the inputs to the DC combiner strays away from 380 VDC ($V_{in2}$), the inverter regulates the voltage at about 380 VDC. The AC output of the inverter (i.e., the 240 VAC output, $V_{out2}$) is generated from an output transformed whose input is a three-phase 208 VAC ($V_{out1}$) which is provided to AC loads similar to traditional circuits in a modern circuit breaker panel in a dwelling with a plurality of AC circuit breakers. The AC circuit breakers can be ground fault interrupt breakers as well as equipped with arc fault detection circuitry, as is known to a person having ordinary skill in the art.

As shown in FIG. 1, the various DC inputs discussed above optionally enter the DC combiner via a DC master disconnect switch. This DC master switch is a mechanical switch that when placed in the off position disconnects all DC inputs from the DC combiner. Each individual DC input is routed to the DC combiner separately via the DC master disconnect switch. In addition, each individual DC input is electrically isolated from other DC inputs.

Referring to FIG. 1, there are transformers shown for conditioning AC input voltages from the utility lines, an example of which is MADDOX MIT-DRY-122 Single Phase 50 kVA.

Figure 2:
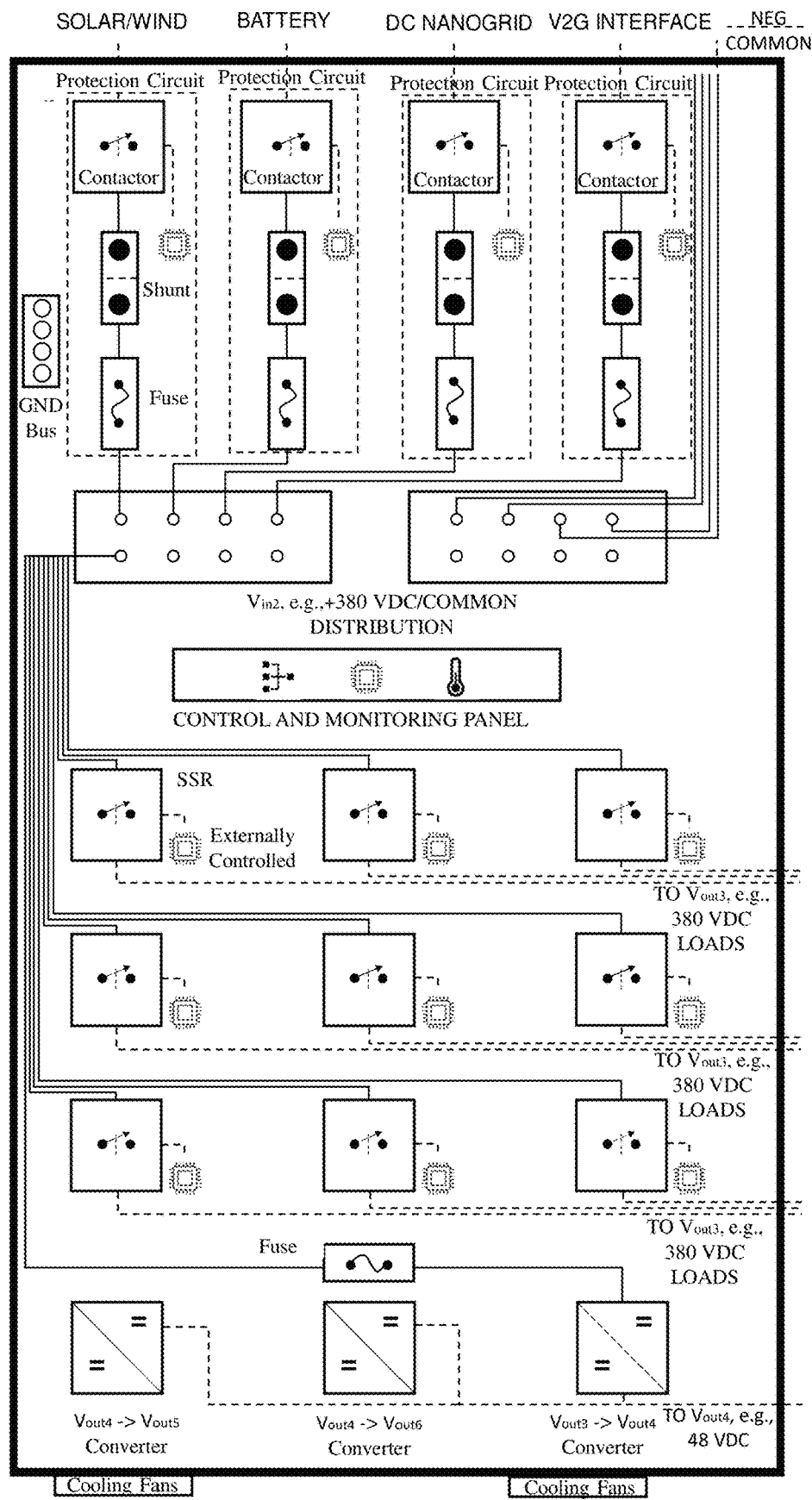
FIG. 2 is a schematic of the DC combiner of FIG. 1, according to one embodiment of the present disclosure.

Referring to FIG. 2, the DC combiner is shown in greater detail, according to the present disclosure. The DC combiner includes a microprocessor circuit including a microprocessor and a non-transient memory coupled thereto and configured to execute instructions housed on the non-transient memory as related to the control of the DC combiner, such as disconnecting each input based on various conditions, such as excess current, temperature, and external command inputs from external components coupled to the microprocessor circuit. As discussed above, the DC combiner includes several inputs each coupled to the above-described DC source (conditioned or direct connection) via the optional DC master disconnect switch. While four inputs are shown, no such limitation is intended, hereby. The four inputs are marked as solar PV/wind, battery, DC nanogrid, and V2G (vehicle to grid) interface.

According to one embodiment of the present disclosure, each input discussed above is coupled to a protection circuit. According to one non-limiting embodiment of the present disclosure, the protection circuit includes a microprocessor-controlled input switch referenced as contactor. According to one example, the microprocessor-controlled input switch may be a solid state relay (SSR), known to a person having ordinary skill in the art, or an electrical contactor (e.g., KILOVAC LEV200 Series 900 VDC High Voltage). These microprocessor-controlled input switches disconnect the corresponding input from the remaining parts of the DC combiner, selectively, based on specific conditions (e.g., temperature of the switch, current passing through the switch, over-voltage, etc.). Such microprocessor-controlled input switches may be provided as discrete components or as part of an application specific integrated circuit (ASIC).

Further as part of each protection circuit, each microprocessor-controlled input switch may be optionally coupled to a smart current sensor DC shunt (e.g., RIEDON SSA Smart Current Sensor 500 A) which monitors current passing through the shunt, optionally coupled to the microprocessor of the microprocessor circuit via a standalone or built in analog to digital converter (ADC) to inform the processor of the current passing through; or alternatively as a standalone high-current shutoff circuit with a dedicated input to the microprocessor-controlled input switch. It should be noted that while the smart current sensor DC shunts are shown to be installed on the high-side of the DC combiner, these smart current sensor DC shunts can also be coupled on the low-side of the DC combiner. While not shown, each smart current sensor DC shunt is coupled to the microprocessor of the DC combiner for monitoring the current passing through each of the smart current sensor DC shunts.

Further as part of each protection circuit, each smart current sensor DC shunt is optionally coupled to a corresponding fuse (e.g., RIEDON CFB1-110 Series Deltec Class T Fuse 110 A) for duplicate safety. The output of each fuse is coupled to a positive $V_{in2}$, e.g., about 380 VDC distribution busbar (e.g., CE+T AMERICA PD402_703_2 Tin Plate DC Busbar) allowing integration of current passing through the DC combiner. A similar busbar is also used for the negative side of each DC source which is integrated together by the negative $V_{in2}$, e.g., about 380 VDC, distribution busbar. The negative sides are coupled to each other, thereby constituting a negative common line for all the DC inputs. While not shown, the negative sides from each DC load (discussed further below) return to the DC combiner and are coupled to the common $V_{in2}$, e.g., about 380 VDC, distribution busbar thus electrically connecting to the negative common.

Still further as part of the protection circuit, while not shown, each smart current sensor DC shunt is optionally coupled to or alternatively includes a corresponding temperature monitoring circuit optionally coupled to the microprocessor of the microprocessor circuit via a standalone or built in ADC to provide data regarding temperature; or alternatively as a standalone high-temperature shutoff circuit with a dedicated input to the microprocessor-controlled input switch. Each DC shunt may provide the associated current readings via one or more of a sense resistor with a dedicated amplification circuit and a hall-effect mechanism.

The positive $V_{in2}$, e.g., about 380 VDC, distribution busbar feeds a plurality of SSRs which according to one embodiment can be microprocessor controlled (e.g., VB CONTROLS PE6040 DC Solid State Relay). Each SSR establishes a DC circuit with DC outlets and corresponding loads. The network of these SSRs allow isolation of each DC circuit from other DC circuits, thereby providing selective control of each circuit. These SSRs are optionally microprocessor controlled providing remote disconnect via WiFi.

The positive $V_{in2}$, e.g., about 380 VDC, distribution busbar also feeds another optional SSR (not shown) for low-voltage output of the DC combiner. The output of this optional SSR (not shown) is coupled to a $V_{out3}/V_{out4}$, e.g., about 380 VDC/48 VDC DC-DC converter (e.g., VICOR BCM Bus Converter BCM4414VD1E5135T02), which is configured to provide a $V_{out4}$, e.g., about 48 VDC, output from the DC combiner for the associated VDC loads within the dwelling. The $V_{out4}$, e.g., about 48 VDC, output is also used to generate other voltages, e.g., about 24 VDC and about 12 VDC via separate DC-DC converters, thus generating 12 VDC and 24 VDC outputs from the DC combiner (as discussed and shown in FIG. 1, identified as other loads).

While a nominal voltage of 380 VDC has been discussed herein, no such limitation is intended hereby. Specifically, other voltages such as 480 VDC or 600 VDC or lower are within the ambit of the present disclosure. Furthermore, the DC regulation functionality currently residing in the inverter can be ported to a DC regulator, known to a person having ordinary skill in the art. Finally, the output AC voltage herein identified as $V_{out1}$, e.g., about 208 VAC, may be varied to be other voltages, e.g., about 240 VAC, by use of a different inverter thus eliminating the need for the cited output transformer.

Those having ordinary skill in the art will recognize that numerous modifications can be made to the specific implementations described above. The implementations should not be limited to the particular limitations described. Other implementations may be possible.

The invention claimed is:

1. A direct current (DC) electrical panel (DC Combiner), comprising:

a plurality of input pairs of positive and negative inputs, each input pair of the plurality of input pairs configured to provide a positive DC input at a predefined voltage and a negative DC return;

each positive input coupled to a protection circuit whereby each such positive input isolated from other positive inputs of the plurality of input pairs, thereby generating a protected input;

each protected input coupled to a busbar; and the busbar coupled to a plurality of switched circuits via a breaker switch in line with a protected input, wherein each of the protection circuits includes an input disconnect switch coupled to an associated positive input, thereby generating a positive switched input, and wherein each of the protection circuits further includes a DC shunt coupled to an associated positive switched input and configured to provide a current reading passing through or a temperature reading of the DC shunt, thereby generating a positive shunted switched input.

2. The DC Combiner of claim 1, each of the protection circuits further includes a fuse coupled to an associated positive shunted switched input and configured to interrupt current path therethrough when current through the fuse surpasses a predefined fuse level, thereby generating a positive fused shunted switched input.

3. The DC combiner of claim 1, wherein one of the plurality of positive inputs is regulated at the predefined voltage.

4. The DC combiner of claim 3, wherein the predefined voltage is about 380 VDC.

5. The DC combiner of claim 1, wherein one or more of the protection circuits is coupled to and controlled by a microprocessor coupled to or having embedded thereon a non-transient memory housing instructions, whereby the microprocessor executes the instructions to monitor the current level of an associated DC shunt and interrupts current through the associated positive input by opening associated input disconnect switch when said current surpasses a predefined switch level.

6. The DC combiner of claim 1, wherein one or more of the protection circuits is coupled to and controlled by a microprocessor coupled to or having embedded thereon a non-transient memory housing instructions, whereby the microprocessor executes the instructions to monitor the temperature level of an associated DC shunt and interrupts current through the associated positive input by opening the associated input disconnect switch when said temperature level surpasses a predefined temperature level.

7. The DC combiner of claim 1, wherein one or more DC shunts provide associated current readings via one or more of a sense resistor with a dedicated amplification circuit and a hall-effect mechanism.

8. The DC combiner of claim 1, wherein the busbar is coupled to one or more internal DC-DC converters configured to provide a down-converted voltage as one or more low-voltage DC outputs including about 48 VDC, about 24 VDC, and Bout 12 VDC.

9. The DC combiner of claim 1, wherein one or more protection circuits includes a dedicated ground fault interrupt circuit configured to disrupt current running therethrough when a ground fault is sensed.

10. The DC combiner of claim 1, wherein one or more protection circuits includes a dedicated arc fault interrupt circuit configured to disrupt current running therethrough when an arc is sensed.

11. The DC combiner of claim 1, wherein one or more of the breaker switches is coupled to and controlled by a microprocessor coupled to or having embedded thereon a non-transient memory housing instructions, whereby the microprocessor executes the instructions to open the associated breaker switch via a wired or wireless network coupled to the microprocessor.

12. A nanogrid system for use in a commercial or residential setting (dwelling), comprising:
an alternating current (AC) utility input from a utility provider;
a plurality of direct current (DC) sources configured to generate DC voltage at one or more DC levels, wherein each DC source generating a voltage different than a predefined voltage is coupled to an external DC-DC converter configured to output a DC voltage at about the predefined voltage, thereby generating a converted DC source;
a bidirectional inverter coupled to the AC utility input and a DC electrical panel (DC Combiner), the bidirectional inverter configured to invert the DC voltage at the DC combiner to an AC voltage to be used by AC loads within the dwelling;
the DC combiner, comprising:
a plurality of input pairs of positive and negative inputs, each input pair of the plurality of input pairs configured to provide a positive DC input at a predefined voltage and a negative DC return, one or more of the plurality of input pairs each coupled to an associated DC source or to an associated converted DC source;
each positive input coupled to a protection circuit whereby each such positive input isolated from other positive inputs of the plurality of input pairs, thereby generating a protected input;
each protected input coupled to a busbar; and
the busbar coupled to a plurality of switched circuits via a breaker switch in line with a protected input.

13. The nanogrid system of claim 12, wherein one of the plurality of positive inputs is regulated at the predefined voltage by the bidirectional inverter.

14. The nanogrid system of claim 13, wherein the predefined voltage is about 380 VDC.

15. The nanogrid system of claim 12, each of the protection circuits includes an input disconnect switch coupled to an associated positive input, thereby generating a positive switched input.

16. The nanogrid system of claim 15, each of the protection circuits further includes a DC shunt coupled to an associated positive switched input and configured to provide a current reading passing through or a temperature reading of the DC shunt, thereby generating a positive shunted switched input.

17. The nanogrid system of claim 16, each of the protection circuits further includes a fuse coupled to an associated positive shunted switched input and configured to interrupt current path therethrough when current through the fuse surpasses a predefined fuse level, thereby generating a positive fused shunted switched input.

18. The nanogrid system of claim 16, wherein one or more of the protection circuits is coupled to and controlled by a microprocessor coupled to or having embedded thereon a non-transient memory housing instructions, whereby the microprocessor executes the instructions to monitor the current level of an associated DC shunt and interrupts current through the associated positive input by opening associated input disconnect switch when said current surpasses a predefined switch level.

19. The nanogrid system of claim 16, wherein one or more of the protection circuits is coupled to and controlled by a microprocessor coupled to or having embedded thereon a non-transient memory housing instructions, whereby the microprocessor executes the instructions to monitor the temperature level of an associated DC shunt and interrupts current through the associated positive input by opening the associated input disconnect switch when said temperature level surpasses a predefined temperature level.

20. The nanogrid system of claim 16, wherein one or more DC shunts provide associated current readings via one or more of a sense resistor with a dedicated amplification circuit and a hall-effect mechanism.

21. The nanogrid system of claim 12, wherein the busbar is coupled to one or more internal DC-DC converters configured to provide a down-converted voltage as one or more low-voltage DC outputs including about 48 VDC, about 24 VDC, and about 12 VDC.

22. The nanogrid system of claim 12, wherein one or more protection circuits includes a dedicated ground fault interrupt circuit configured to disrupt current running therethrough when a ground fault is sensed.

23. The nanogrid system of claim 12, wherein one or more protection circuits includes a dedicated arc fault interrupt circuit configured to disrupt current running therethrough when an arc is sensed.

24. The nanogrid system of claim 12, wherein one or more of the breaker switches is coupled to and controlled by a microprocessor coupled to or having embedded thereon a non-transient memory housing instructions, whereby the microprocessor executes the instructions to open the associated breaker switch via a wired or wireless network coupled to the microprocessor.

25. The nanogrid system of claim 12, wherein each DC source of the plurality of DC sources or each DC converted source is coupled to the DC combiner via a master disconnect switch configured to cut off all said sources from the DC combiner.

26. The nanogrid system of claim 12, wherein plurality of DC sources include one or more of solar photovoltaic panel systems, wind turbine systems, tidal power generation system, battery systems, and vehicle to grid systems.

* * * * *